(12) United States Patent
Boller et al.

(10) Patent No.: US 11,428,264 B2
(45) Date of Patent: Aug. 30, 2022

(54) ROTARY SYSTEM WITH AXIAL GAS BEARING

(71) Applicant: FISCHER ENGINEERING SOLUTIONS AG, Herzogenbuchsee (CH)

(72) Inventors: Rolf Boller, Sissach (CH); Simon Hager, Bern (CH)

(73) Assignee: Fischer Engineering Solutions AG, Herzogenbuchsee (CH)

( * ) Notice: Subject to any disclaimer, the term of this patent is extended or adjusted under 35 U.S.C. 154(b) by 668 days.

(21) Appl. No.: 16/345,902

(22) PCT Filed: Oct. 30, 2017

(86) PCT No.: PCT/EP2017/077725
§ 371 (c)(1),
(2) Date: Apr. 29, 2019

(87) PCT Pub. No.: WO2018/078150
PCT Pub. Date: May 3, 2018

(65) Prior Publication Data
US 2019/0293119 A1    Sep. 26, 2019

(30) Foreign Application Priority Data
Oct. 31, 2016    (EP) .................... 16196569

(51) Int. Cl.
*F16C 32/06*    (2006.01)
*F16C 27/02*    (2006.01)
(Continued)

(52) U.S. Cl.
CPC .......... *F16C 33/1005* (2013.01); *F16C 17/04* (2013.01); *F16C 35/02* (2013.01);
(Continued)

(58) Field of Classification Search
CPC .. F16C 27/02; F16C 32/0603; F16C 32/0677; F16C 32/0692; F16C 33/1005; F16C 37/002; F16C 2360/23
See application file for complete search history.

(56) References Cited

U.S. PATENT DOCUMENTS 3,493,273 A * 2/1970 Greenberg .............. F16C 35/10
384/111
4,099,799 A 7/1978 Fletcher et al.
(Continued)

FOREIGN PATENT DOCUMENTS

CH       658499 A5    11/1986
DE       6907334 U    11/1969
(Continued)

OTHER PUBLICATIONS

European Search Report Corresponding to 16196569.4 dated May 3, 2017.
(Continued)

*Primary Examiner* — Phillip A Johnson
(74) *Attorney, Agent, or Firm* — Finch & Maloney PLLC; Jay S. Franklin; Michael J. Bujold (57) ABSTRACT

A rotation system (10) is disclosed having at least one axial gas bearing, containing: a housing (11), a shaft (12) that can be rotated relative to the housing (11), at least one bearing plate (13) attached to the shaft (12), and at least one bearing assembly (14) which supports the bearing plate (13) relative to the housing (11), via an axial gas bearing. The bearing assembly (14) has, from inside to outside, a radially inner region (15) supporting the bearing plate (13), a radially central region (16) and a radially outer region (17) held by the housing (11). The radially inner region (15) contains at least one axial bearing element (19) and at least one retention element (20). The bearing plate (13) is supported by the
(Continued)

axial bearing element (19), and the retention element (20) holds the axial bearing element (19) in the axial direction.

19 Claims, 13 Drawing Sheets

(51) Int. Cl.
*F16C 33/10* (2006.01)
*F16C 37/00* (2006.01)
*F16C 35/02* (2006.01)
*F16C 17/04* (2006.01)

(52) U.S. Cl.
CPC ............ *F16C 37/002* (2013.01); *F16C 27/02* (2013.01); *F16C 32/0603* (2013.01); *F16C 32/0692* (2013.01); *F16C 2360/23* (2013.01)

(56) References Cited

U.S. PATENT DOCUMENTS

| | | | |
|---|---|---|---|
| 4,199,996 A * | 4/1980 | Moriwaki | F16C 29/025 74/89.32 |
| 4,241,958 A | 12/1980 | Möller et al. | |
| 4,648,475 A | 3/1987 | Veglia | |
| 4,940,347 A | 7/1990 | Lund | |
| 5,033,871 A | 7/1991 | Ide | |
| 5,054,938 A | 10/1991 | Ide | |
| 5,066,144 A | 11/1991 | Ide | |
| 5,102,236 A | 4/1992 | Ide | |
| 5,102,237 A | 4/1992 | Ide | |
| 5,112,143 A | 5/1992 | Ide | |
| 5,120,144 A | 6/1992 | Lund | |
| 5,125,754 A | 6/1992 | Ide | |
| 5,137,373 A | 8/1992 | Ide | |
| 5,222,815 A | 6/1993 | Ide | |
| 5,246,295 A | 9/1993 | Ide | |
| 5,255,984 A | 10/1993 | Ide | |
| 5,284,392 A | 2/1994 | Ide | |
| 5,304,006 A | 4/1994 | Ide | |
| 5,328,198 A | 7/1994 | Adams | |
| 5,372,431 A | 12/1994 | Ide | |
| 5,382,097 A | 1/1995 | Ide | |
| 5,385,409 A | 1/1995 | Ide | |
| 5,393,145 A | 2/1995 | Ide | |
| 5,403,154 A | 4/1995 | Ide | |
| 5,421,655 A | 6/1995 | Ide et al. | |
| 5,425,584 A | 6/1995 | Ide | |
| 5,441,347 A | 8/1995 | Ide | |
| 5,455,778 A | 10/1995 | Ide et al. | |
| 5,459,674 A | 10/1995 | Ide et al. | |
| 5,489,155 A | 2/1996 | Ide | |
| 5,503,479 A | 4/1996 | Ide | |
| 5,513,917 A | 5/1996 | Ide et al. | |
| 5,515,458 A | 5/1996 | Ide | |
| 5,531,522 A | 7/1996 | Ide et al. | |
| 5,556,208 A | 9/1996 | Ide | |
| 5,558,444 A | 9/1996 | Ide | |
| 5,564,836 A | 10/1996 | Ide et al. | |
| 5,603,574 A | 2/1997 | Ide et al. | |
| 5,620,260 A | 4/1997 | Ide | |
| 5,660,481 A | 8/1997 | Ide | |
| 5,743,654 A | 4/1998 | Ide et al. | |
| 7,883,311 B2 | 2/2011 | Moniz et al. | |
| 7,946,118 B2 | 5/2011 | Hippen et al. | |
| 8,821,136 B2 | 9/2014 | Komatsu et al. | |
| 9,121,448 B2 | 9/2015 | Delgado Marquez et al. | |
| 9,664,050 B2 | 5/2017 | Hippen et al. | |
| 10,309,300 B2 | 6/2019 | Garrard et al. | |
| 10,495,140 B2 | 12/2019 | Hinds | |
| 2004/0057642 A1 * | 3/2004 | New | F16C 32/0692 384/122 |
| 2013/0129506 A1 | 5/2013 | Nguyen-Schaefer | |
| 2015/0104124 A1 | 4/2015 | Delgado Marquez et al. | |
| 2016/0237823 A1 | 8/2016 | Garrard et al. | |
| 2017/0108035 A1 | 4/2017 | Hinds | |
| 2019/0226489 A1 * | 7/2019 | Bonnefoi | F04D 29/059 |
| 2020/0028402 A1 | 1/2020 | Looser et al. | |
| 2020/0032653 A1 | 1/2020 | Garrard et al. | |

FOREIGN PATENT DOCUMENTS

| | | | |
|---|---|---|---|
| DE | 2756183 A * | 6/1978 | ............ B23Q 1/38 |
| DE | 10 2007 062 496 A1 | 6/2008 | |
| DE | 102016212866 A1 | 1/2018 | |
| GB | 2 074 254 A | 10/1981 | |
| JP | 56141866 A * | 11/1981 | |
| JP | 2013-217426 A | 10/2013 | |
| JP | 2014015854 A2 | 1/2014 | |
| KR | 20150075197 A | 7/2015 | |
| WO | 8809443 A1 | 12/1988 | |
| WO | 9117366 A1 | 11/1991 | |
| WO | 9117367 A1 | 11/1991 | |
| WO | 9119112 A1 | 12/1991 | |
| WO | 9202736 A1 | 2/1992 | |
| WO | 9203667 A1 | 3/1992 | |
| WO | 9218783 A1 | 10/1992 | |
| WO | 9322573 A1 | 11/1993 | |
| WO | 9322575 A1 | 11/1993 | |
| WO | 9400819 A1 | 1/1994 | |
| WO | 9407043 A1 | 3/1994 | |
| WO | 9408149 A1 | 4/1994 | |
| WO | 9408150 A1 | 4/1994 | |
| WO | 9505547 A1 | 2/1995 | |
| WO | 9516863 A1 | 6/1995 | |
| WO | 9528574 A1 | 10/1995 | |
| WO | 2011057738 A2 | 5/2011 | |
| WO | 2013079896 A1 | 6/2013 | |
| WO | 2014120302 A2 | 8/2014 | |
| WO | 2017/202941 A1 | 11/2017 | |

OTHER PUBLICATIONS

International Search Report Corresponding to PCT/EP2017/077725 dated Jan. 23, 2018.
Written Opinion Corresponding to PCT/EP2017/077725 dated Jan. 23, 2018.

* cited by examiner

ROTARY SYSTEM WITH AXIAL GAS BEARING

This invention concerns a rotary system with at least one axial gas bearing.

Rotary systems with axial gas bearings comprise a housing, a shaft rotatable relative to the housing, at least one bearing washer fastened to the shaft and at least one bearing assembly which supports the bearing washer relative to the housing by an axial gas bearing. The bearing assembly contains at least one axial bearing element, which in many embodiments is formed by two axial bearing washers between which the bearing washer is mounted. An air gap is formed between the bearing washer and the axial bearing washers, which air gap provides the gas bearing.

DE 10 2007 062 496 A1 reveals, among other things, bearing arrangements used in conjunction with gas turbine engines. The bearing arrangement comprises a pair of lamellar thrust bearings and a pair of spring means arranged substantially coaxially on the pair of lamellar thrust bearings. In this way, the bearing is spring-loaded in the axial direction. However, the air gaps present here are dependent on the gas pressure, which is disadvantageous. Furthermore, these bearing arrangements each contain a large number of independent components, all of which are subject to tolerances that add up.

DE 6907334 U reveals a small electric machine with a rotating shaft which carries at least one intermediate disc which is elastic in the axial direction.

For gas bearings, it is crucial that the dimensions of the air gap remain as constant as possible. A too wide air gap would reduce the gas pressure locally, so that the bearing would be unstable. If the air gap is too narrow, the bearing surfaces may come into contact. This can lead to the destruction of the entire rotary system, especially at high rotation speeds. However, many rotary systems are often exposed to high temperatures and/or high temperature differences and/or other particularly variable operating influences, such as variable gas pressures or centrifugal forces. This can lead to considerable distortion of individual parts of the rotary system. For example, the housing can deform at high temperatures, which is transferred to the bearing surfaces of the axial bearing elements via the bearing arrangement. For example, the bearing surfaces of two axial bearing washers facing the bearing washer may lose their flatness or parallelism. Overall, safe operation of the rotary system can then no longer be guaranteed.

It is a task of the present invention to provide an improved rotary system which meets the mentioned requirements as far as possible even at high rotation speeds and/or high temperatures and/or high temperature differences and/or further in particular variable operating influences, such as variable gas pressures or centrifugal forces. The air gap formed between the bearing assembly and the bearing washer should therefore remain as constant as possible even under these conditions, i.e. as independent of these conditions as possible. In particular, in individual embodiments, the bearing surfaces of the axial bearing washers should remain as parallel as possible to each other.

These and other tasks are solved by the inventive rotary system. It contains a housing, a shaft rotatable relative to the housing, at least one flat bearing washer, for example, fastened to the shaft, and at least one bearing assembly which supports the bearing washer relative to the housing by an axial gas bearing. An air gap is thus formed between the bearing assembly, in particular the axial bearing washers described below, and the bearing washer. The axial gas bearing arrangement can be an aerodynamic gas bearing arrangement, an aerostatic gas bearing arrangement, a tilting pad gas bearing arrangement or a foil bearing arrangement. As mentioned above, the bearing washer can be flat; alternatively, however, it can also be conical or have a free geometry, provided that opposite bearing surfaces allow a defined air gap.

According to the invention, the bearing assembly has, from the inside to the outside, a radially inner region supporting the bearing washer, a radially central region and a radially outer region held by the housing. The radially inner region contains at least one axial bearing element and at least one holding element, the bearing washer being mounted by means of the axial bearing element and the holding element retaining the axial bearing element in the axial direction.

Due to this inventive design, the air gap formed between the bearing assembly and the bearing washer can remain very constant even at high rotational speeds and/or high temperatures and/or high temperature differences and/or other particularly variable operating influences such as variable gas pressures or centrifugal forces, i.e. practically independent of these operating influences. In particular, the resulting housing deformations can be minimized, depending on operating influences, so that the desired air gap deforms within a very small permissible range. The rotary system can therefore also be operated under these conditions without the risk of excessive deformation of the air gap.

In some embodiments, the radially central region of the bearing assembly may be more elastic than its radially inner region. As a result, the part of the bearing assembly that supports the bearing washer may be more rigid overall, so that, for example, the axial bearing washers of the bearing assembly remain comparatively parallel to each other even if the housing is distorted. Due to its relatively more elastic design, the radially central region as a whole allows a certain elasticity of the radially inner region in relation to the distorting housing. The radially central region may be more elastic than the radially inner region, in particular due to at least one material weakening of the radially central region.

Furthermore, the radially central region of the bearing assembly can be more elastic than its radially outer region. In this way, the bearing assembly can be connected to the housing in a fixed and/or a precisely defined manner. The radially central region may be more elastic than the radially outer region, in particular due to at least one material weakening of the radially central region.

Such a material weakening and an elastic formation of the central region further contribute to the fact that the air gap formed between the bearing assembly and the bearing washer remains very constant even at high rotational speeds and/or high temperatures and/or high temperature differences and/or further in particular variable operating influences, such as, for example, variable gas pressures or centrifugal forces, and consequently the rotational system can also be operated under these conditions without the risk of excessive deformation of the air gap arising.

At least one of the material weakenings can be formed by a recess formed in the axial direction or by an opening penetrating the bearing assembly. For example, the recess of the opening may be formed in a spacer disc described in more detail below, especially in an inner section of such a spacer disc. The cavity can be formed, for example, by a laser-sintered structure, a bore, an axial recess, a laser structure, a casting rib and/or a milled kidney.

Alternatively, material weakening can be achieved by a combination of different materials and/or a combination of identical materials with different properties. Different metals can be joined together to form a bimetal. Material weakening can also be achieved by mixing two or more materials, in particular two or more metals. Materials that are similar in themselves and have different properties can be obtained, for example, by different methods of production and/or processing, such as soft annealing, foaming and/or laser sintering.

In advantageous embodiments, the holding element holds the axial bearing element by clamping, screwing, soldering, welding, shrinking, pressing, bonding, crystallization bonding, press bonding, plastic casting and/or laser sintering.

The at least one axial bearing element may contain or be formed by two axial bearing washers between which the bearing washer is mounted. The at least one holding element may contain or be formed by two clamping rings which clamp the axial bearing washers in the axial direction. Such a clamping does not influence the basic geometry of the axial bearing washers in an inadmissible way and/or prevents inadmissible displacements. Due to the clamping, small displacements in the radial direction are possible without influencing the air gap inadmissibly.

The holding element preferably contains two clamping blocks, each of which has one of the clamping rings in a radially inner region. To simplify the design, the clamping blocks can each be designed in one piece.

The radially central region of the bearing assembly is preferably formed by an inner section of a spacer disc to which the radially inner region of the bearing assembly is attached. Such a spacer disc allows easy and/or precise adjustment of the air gap. The spacer disc may contain or consist of at least one metal and/or at least one plastic.

In particular, the clamping rings described above or the clamping blocks containing the clamping rings may be attached to the inner section of the spacer disc. Preferably, the clamping rings or the clamping blocks containing the clamping rings extend in opposite axial directions away from the inner section of the spacer disc.

It is particularly advantageous if the radially outer region of the bearing assembly is formed by an outer section of the spacer disc which is held by the housing. In combination with the spacer disc and the housing, this results in higher stability, but also in a precise connection.

It is also advantageous if the inner section of the spacer disk extends between two axial bearing washers to the radially inner region of the bearing assembly. Using the clamping rings described above, the axial bearing washers can then be clamped in the axial direction against the inner section of the spacer disc so that each of the two axial bearing washers is clamped in the axial direction between the inner section of the spacer disc and one of the clamping blocks.

Advantageously, the radially central region, in particular the spacer disk, has a modulus of elasticity in the range from 1,000 MPa to 700,000 MPa, preferably from 3,000 MPa to 400,000 MPa, especially preferred from 60,000 MPa to 220,000 MPa.

Advantageous, the radially inner region, in particular the clamping rings, has a modulus of elasticity in the range from 1'000 MPa to 700'000 MPa, preferably from 3'000 MPa to 400'000 MPa, especially preferred from 60'000 MPa to 220'000 MPa.

Advantageous, the radially inner region, in particular the axial bearing washers, has a modulus of elasticity in the range from 10'000 MPa to 900'000 MPa, preferably from 100'000 MPa to 700'000 MPa, especially preferred from 200'000 MPa to 650'000 MPa.

With particular preference, the bearing assembly contains at least one cooling channel extending in the circumferential direction. Such a cooling channel can, for example, be formed inside the bearing washer attached to the shaft or outside this bearing washer, in particular radially outside it. With the help of such a cooling channel, the temperature distribution within the rotary system can be adjusted. This can make a further contribution to ensuring that the air gap retains as defined a geometry as possible. The cooling channel can, for example, be defined by a groove which is formed in a radially outer region of the clamping blocks mentioned above and which is closed in the axial direction away from the bearing washer by an annular cover. Alternatively, the cooling channel can be formed in the bearing washer attached to the shaft, in an axial bearing element, in particular an axial bearing washer, in the spacer disc or in the housing.

Alternatively or additionally, cooling can, for example, be provided by a radial groove on the terminal blocks in the outer area and sealed against the housing by means of sealing elements such as O-rings.

The cooling channel extending in the circumferential direction can be connected to a radial cooling channel in the bearing assembly, in particular in the spacer disc. Furthermore, the radial cooling channel in the bearing assembly can be connected to an axial cooling channel in the housing. In this way, the bearing arrangement can be cooled particularly effectively.

At least one surface enlargement structure may be present in the cooling channel. This is a structure that provides for an enlargement of the areas bounding the cooling channel. In this way, even better heat transfer and thus cooling can be achieved. For example, the surface enlargement structure may contain one or more cooling fins, which may be collar-shaped.

In some embodiments, an axial bearing washer can also be designed as a single piece with a clamping block, which facilitates manufacture and reduces tolerances.

The rotary system may be an electrically driven turbomachine, in particular a compressor, in particular a turbo compressor, an engine or a generator, a turbine, in particular a turbo generator, a turbocharger, a coupling system (in particular a magnetic coupling) or a flywheel, in particular a kinetic accumulator.

In the following, the invention is explained in more detail using an exemplary embodiment. In lateral sectional views, the drawings show.

Figure 1:
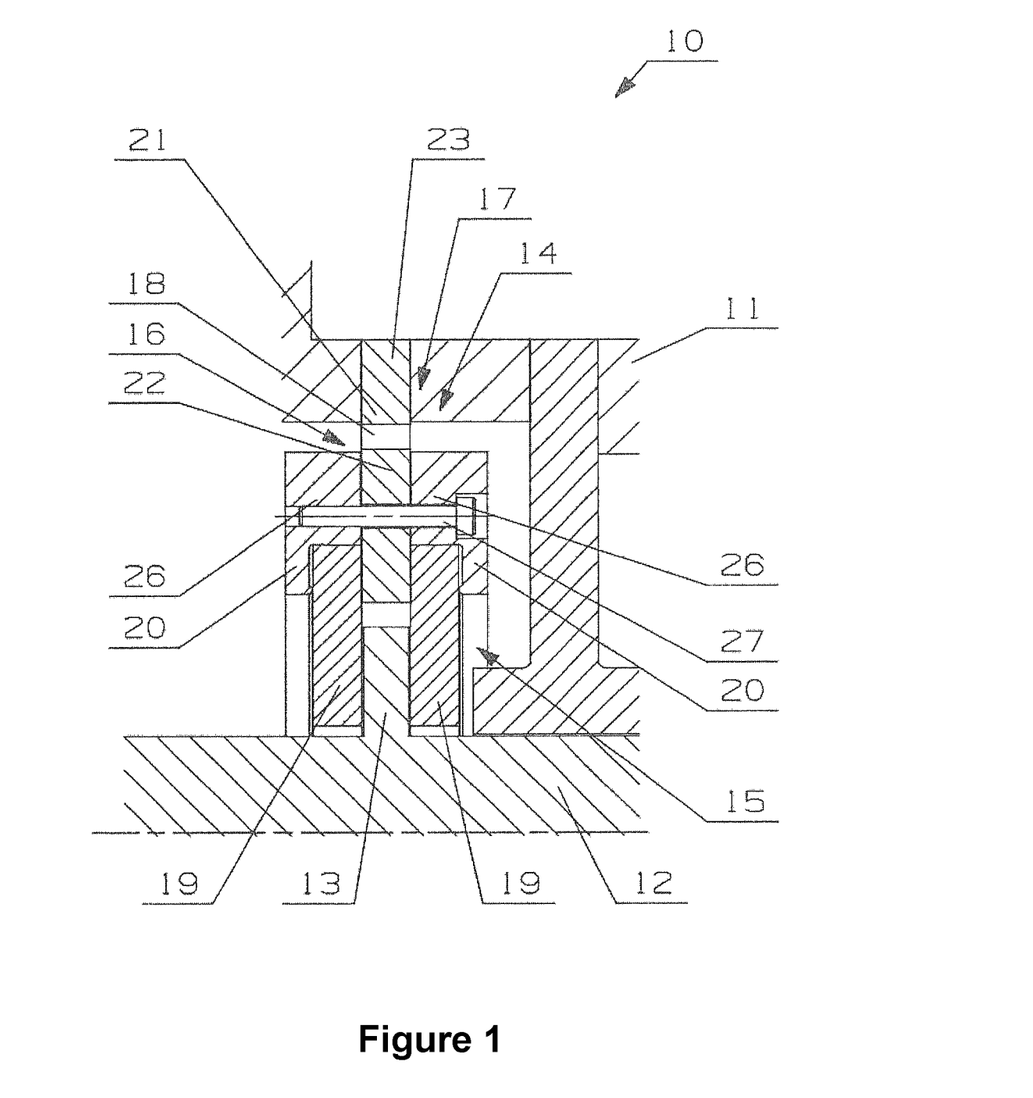
FIG. 1: a first rotary system according to invention.

The rotary system 10 shown in FIG. 1 is designed as a turbo compressor. It contains a housing 11 and a shaft 12 which can be rotated relative to the housing 11. In this example, a flat bearing washer 13 is attached to shaft 12. A bearing assembly 14 supports the bearing washer 13 relative to the housing 11 by an axial gas bearing.

Bearing assembly 14 has, from the inside to the outside, a radially inner region 15 supporting the bearing washer 13, a radially central region 16 and a radially outer region 17 held by the housing 11. More precisely, it contains a spacer disc 21 with an inner section 22 and an outer section 23. The outer section 23 of the spacer disc 21 forms the radially outer region 17 of the bearing assembly 14 which is held on the housing 11. The inner section 22 of spacer 21 forms a radially central region 16 of bearing assembly 14.

The inner section 22 of distance washer 21 extends between two axial bearing washers 19, which form axial bearing elements 19. The bearing washer 13 is mounted between the axial bearing washers 19 and the bearing washer 13, whereby air gaps formed between the axial bearing washers 19 and the bearing washer 13, which are not visible here, provide an axial gas bearing. Two clamping blocks 26 are attached to the inner section 22 of spacer 21 by means of clamping screws 27, wherein the clamping blocks 26 extend in opposite axial directions away from the inner section 22 of spacer 21; only one of them can be seen here. The clamping screws 27 each penetrate both terminal blocks 26 and the spacer disc 21, and their screw heads are accommodated in blind holes of the terminal block 26 shown on the right. The clamping blocks 26 each have a holding element in the radially inner region, which is designed as a clamping ring 20. Using the clamping screws 27, the clamping rings 20 clamp the axial bearing washers 19 in the axial direction against the inner section 22 of the spacer disc 21, so that each of the two axial bearing washers 19 is clamped in the axial direction between the inner section 22 of the spacer disc 21 and one of the two clamping rings 20. Clamping block 26 and axial bearing washers 19 together form a radially inner region 15 of the bearing assembly 14.

In the example shown here, the inner section 22 of spacer disk 21 (i.e. the radially central region 16 of bearing assembly 14) contains several openings 18 penetrating it in the axial direction. In this way, the openings 18 form material weakenings which ensure that the radially central region 16 of bearing assembly 14 is more elastic than the radially inner region 15 (i.e. as the clamping blocks 26 and the axial bearing disks 19). As a result, the part of bearing assembly 14 that supports the bearing washer 13 has a rather rigid design overall, so that the axial bearing washers 19 remain comparatively parallel to each other even if the housing 11 is distorted. Due to its relatively more elastic design, the radially central region 16 allows a certain elasticity of the radially inner region 15 compared to the distorting housing 11. Alternatively or in addition to the openings 18, recesses can also be provided, which can also form material weakenings with the above-mentioned effects. Due to the openings 18 mentioned, the radially central region 16 is also more elastic than the radially outer region 17.

The spacer disk 21 has a modulus of elasticity of preferably 60,000 MPa to 220,000 MPa. The axial bearing washers 19 preferably have a modulus of elasticity of 200,000 MPa to 650,000 MPa. The clamping rings 20 have a preferred modulus of elasticity from 60'000 MPa to 220'000 MPa.

This rotary system 10 according to the invention ensures a high degree of parallelism between the bearing washer 13 and the axial bearing washers 19 even at high rotational speeds and temperatures. The comparatively rigid radially inner region 15, formed by the clamping blocks 26 and the axial bearing washers 19, determines the parallelism. In addition, the openings 18 mechanically decouple the axial bearing washers 19 from the housing 11. Furthermore, the temperature distribution can be specifically influenced with the aid of the cooling channels 24. In the embodiment described here, the terminal blocks 26 are structurally separated from the spacer disc 21, so that the components can each be simpler in shape and production is therefore more economical overall.

Figure 2:
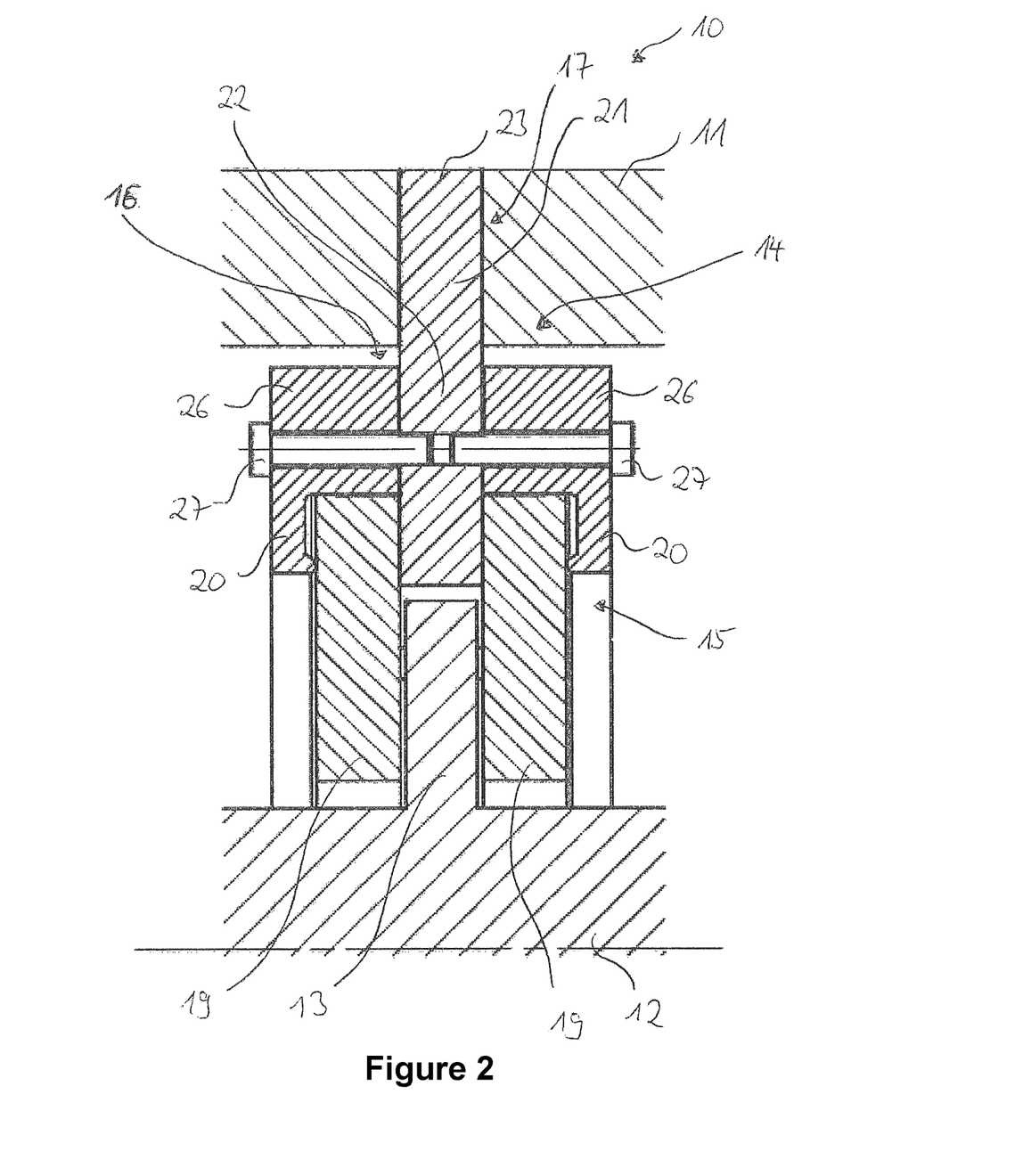
FIG. 2: a second rotary system according to the invention with simplified clamping blocks.

In the rotary system 10 as shown in FIG. 2, each of the two clamping blocks 26 is clamped in the axial direction with the spacer disk 21 using the respective clamping screws 27. In contrast to FIG. 1, the screw heads of the clamping screws 27 are not included in blind holes here.

Figure 3:
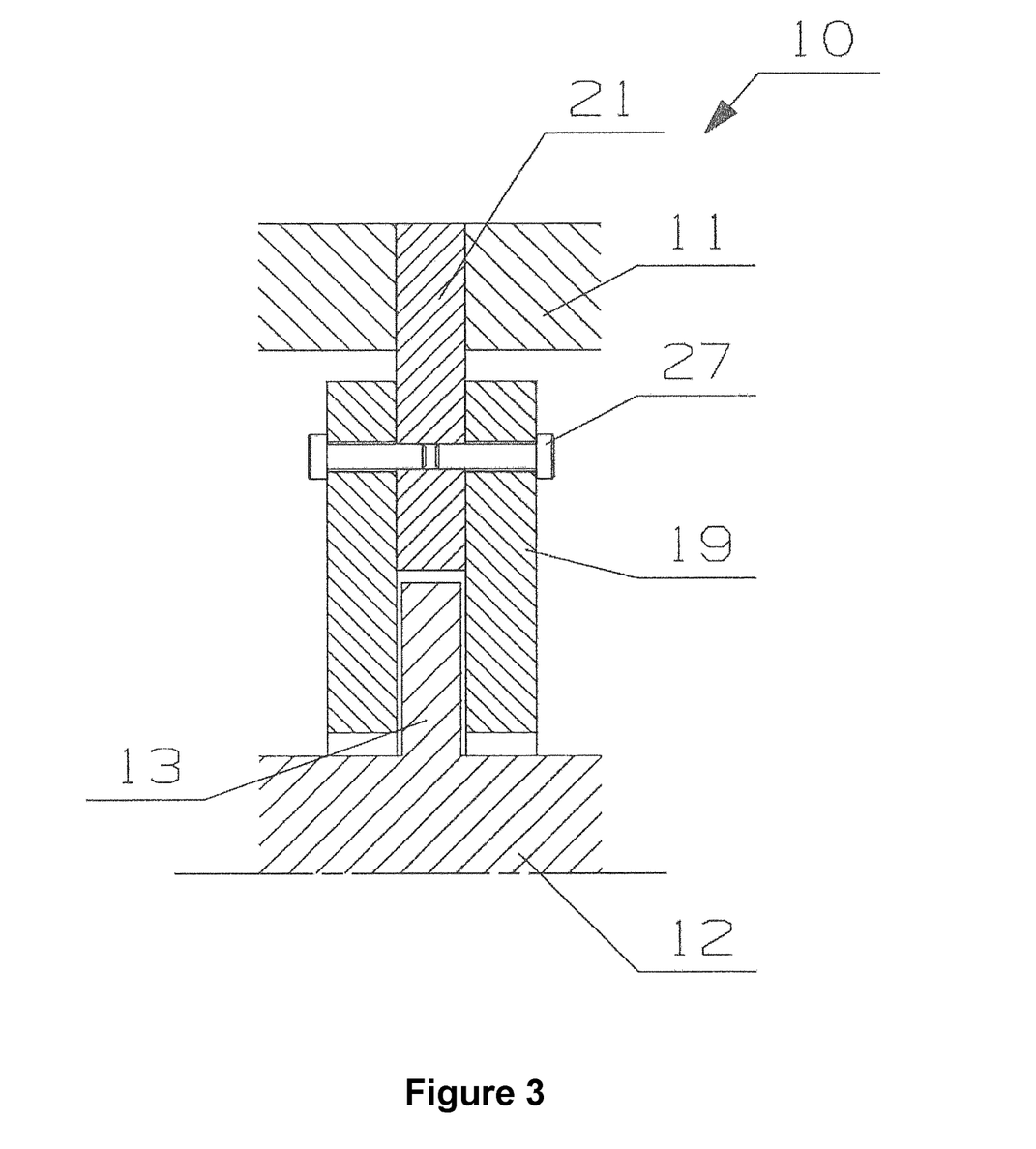
FIG. 3: a rotary system not in accordance with the invention with a clamping block formed in one piece with an axial bearing washer.

In contrast to FIG. 2, the axial bearing washers 19 of the non-inventive rotary system 10 as shown in FIG. 3 are designed in one piece with the clamping block. Alternatively, only one of the two axial bearing washers 19 can be designed as a single piece with a clamping block.

Figure 4:
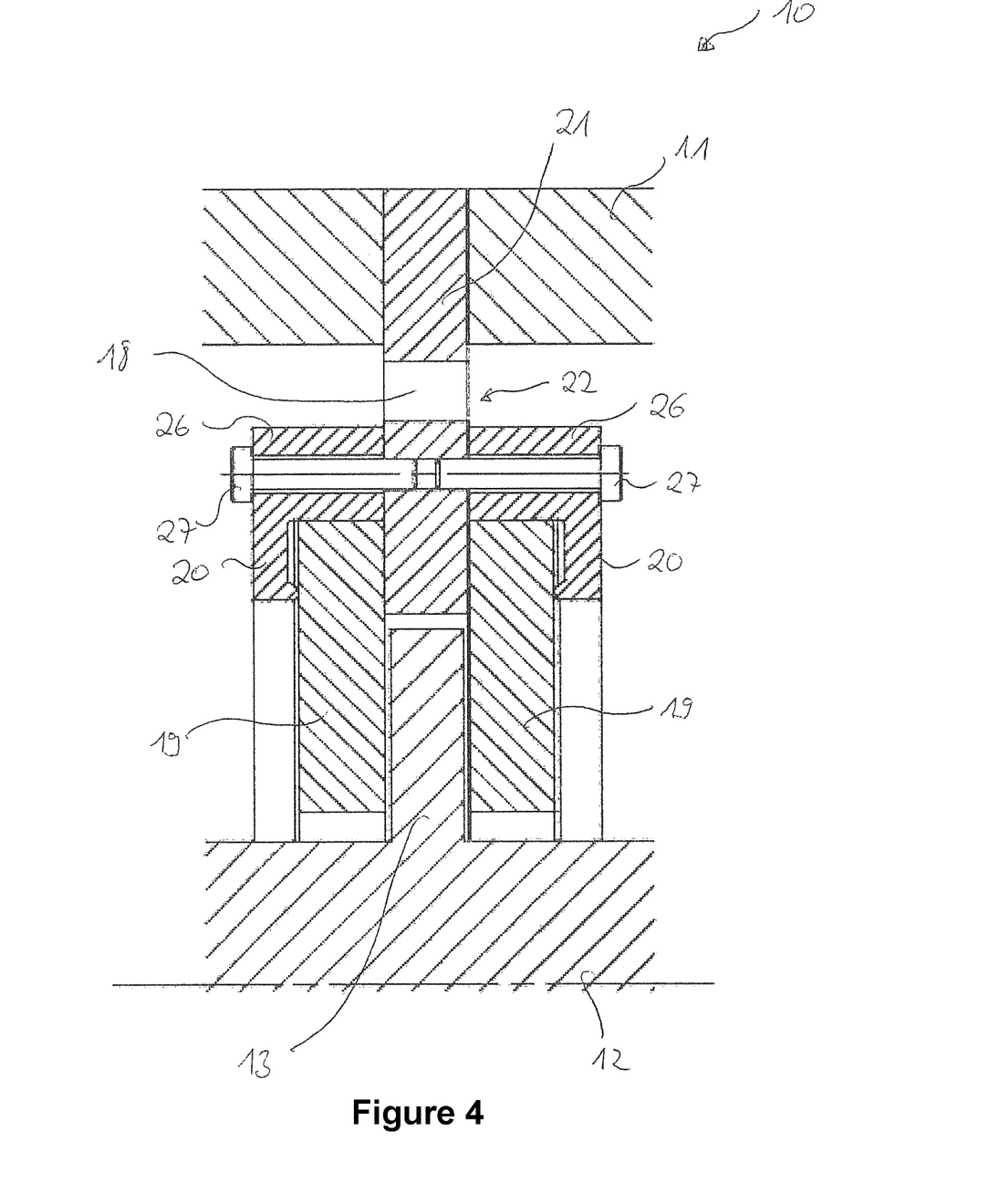
FIG. 4: a third rotary system according to the invention with openings as material weakening.

The rotary system 10 shown in FIG. 4 differs from that shown in FIG. 2 in that the inner section 22 of spacer disk 21 is penetrated by several openings 18 running in the axial direction.

Figure 5:
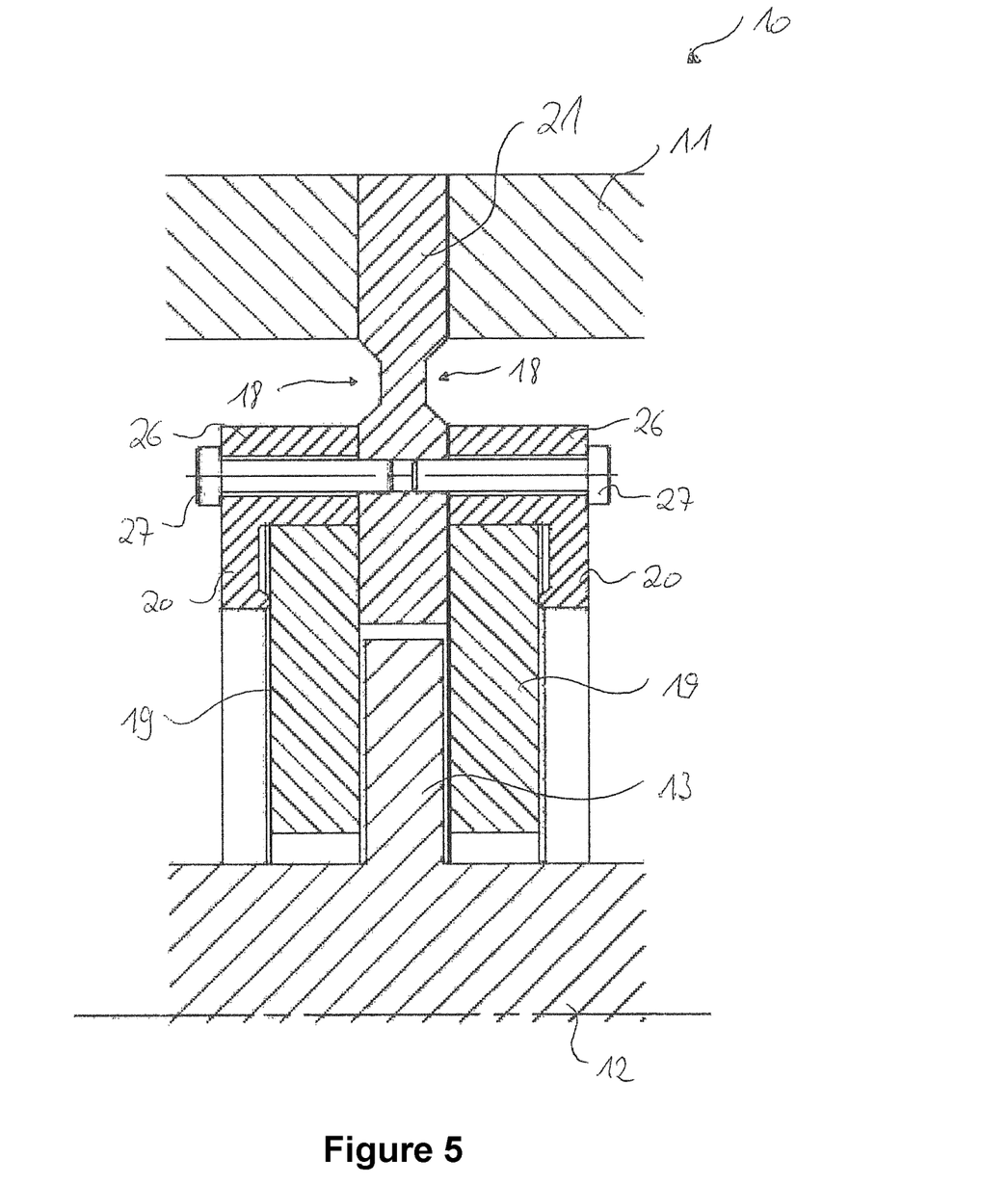
FIG. 5: a fourth rotary system according to the invention with axial recesses as material weakenings.

In the rotary system 10 shown in FIG. 5, the material weakening is not realized by an opening completely penetrating the spacer disk 21, but by axial grooves 18 on both sides, which represent recesses 18 formed in the axial direction. Deviating from this embodiment, the recesses 18 can also be arranged only on one side and/or asymmetrically.

Figure 6:
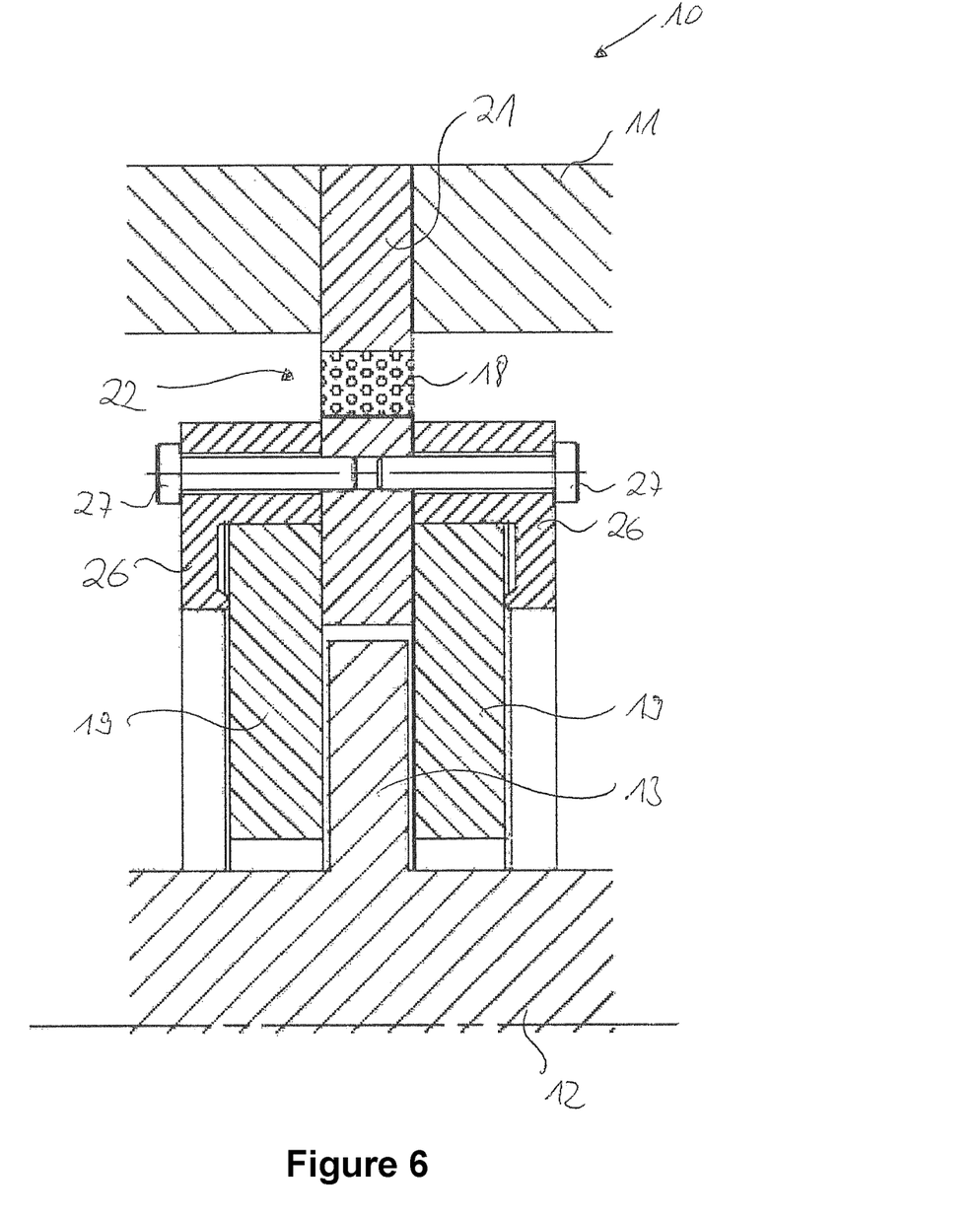
FIG. 6: a fifth rotary system according to the invention with a bimetal as material weakening.

In the example shown in FIG. 6, the material weakening 18 is formed by a bimetal or a mixture of two or more materials, in particular two or more metals, in the inner section 22 of the spacer disk 21. The stiffness of the spacer disk 21 can also be adjusted in this way.

Figure 7:
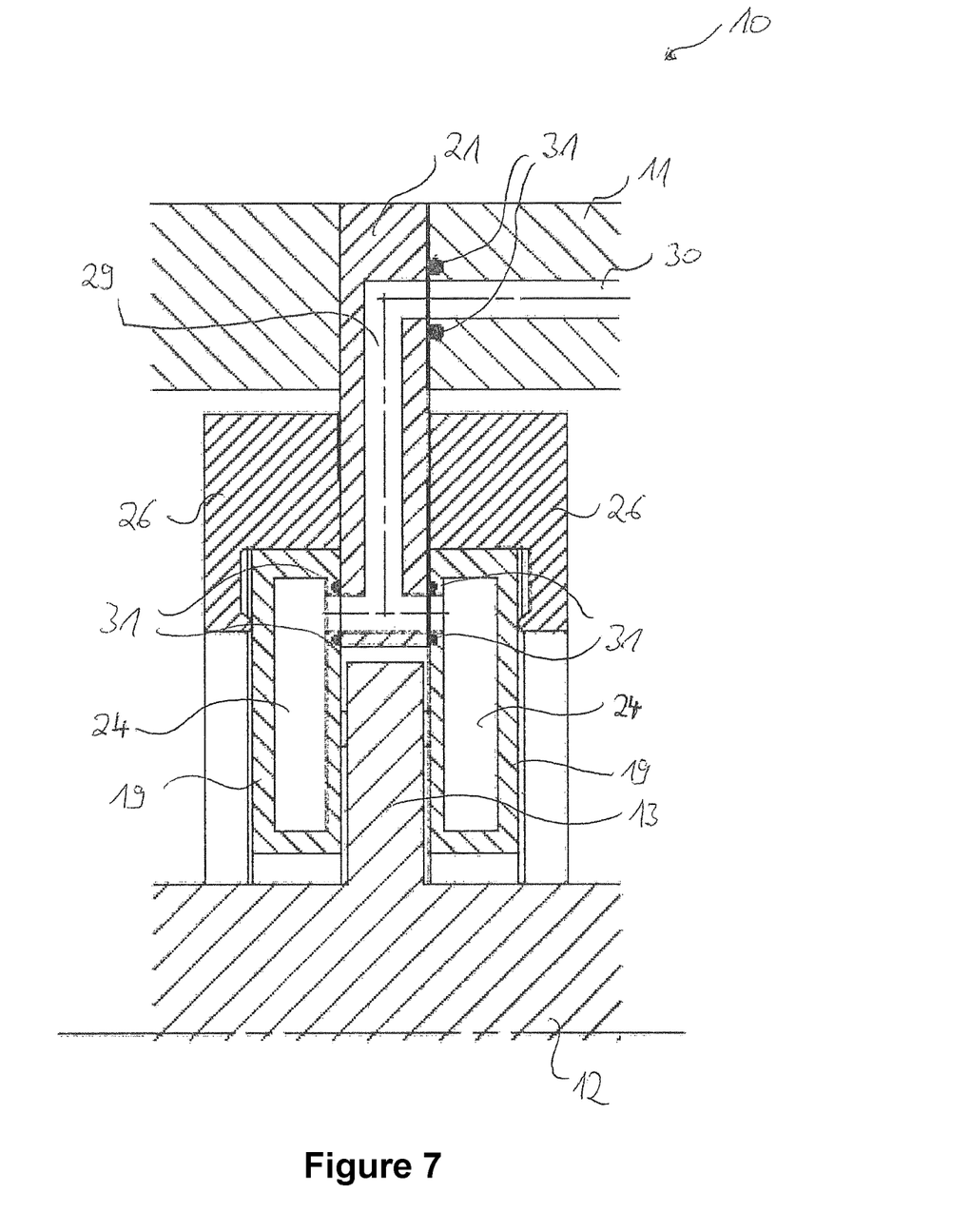
FIG. 7: a sixth rotary system according to the invention with a radial and an axial cooling channel.

In FIG. 7, the axial bearing washers 19 each contain a cooling channel 24 extending in the circumferential direction, which is connected to an axial cooling channel 30 of the housing 11 via radial cooling channels 29 of the spacer disc 21. In this way, a cooling medium, such as water, can be introduced through the axial cooling channel 30 and the radial cooling channels 29 into the cooling channels 24. O-rings 31 are provided at the connection points between the axial bearing washers 19 and the spacer disc 21 and between the spacer disc 21 and the housing 11 to provide an elastic seal.

Figure 8:
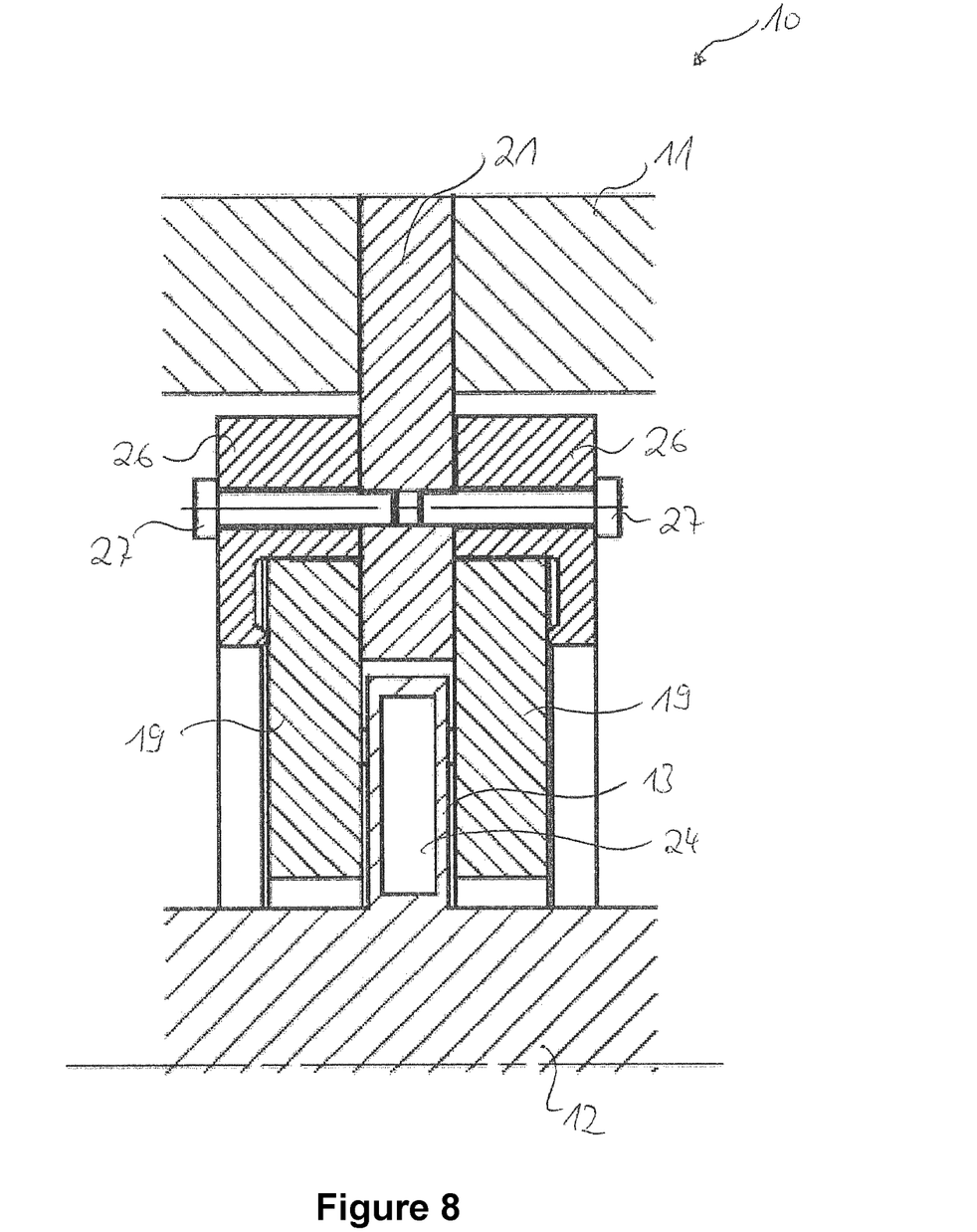
FIG. 8: a seventh rotary system according to the invention with a cooling channel in the bearing washer.

FIG. 8 shows a further embodiment, in which the bearing washer 13 has a cooling channel 24 extending in the circumferential direction, which can be supplied with a cooling medium by the shaft 12 (not shown).

Figure 9:
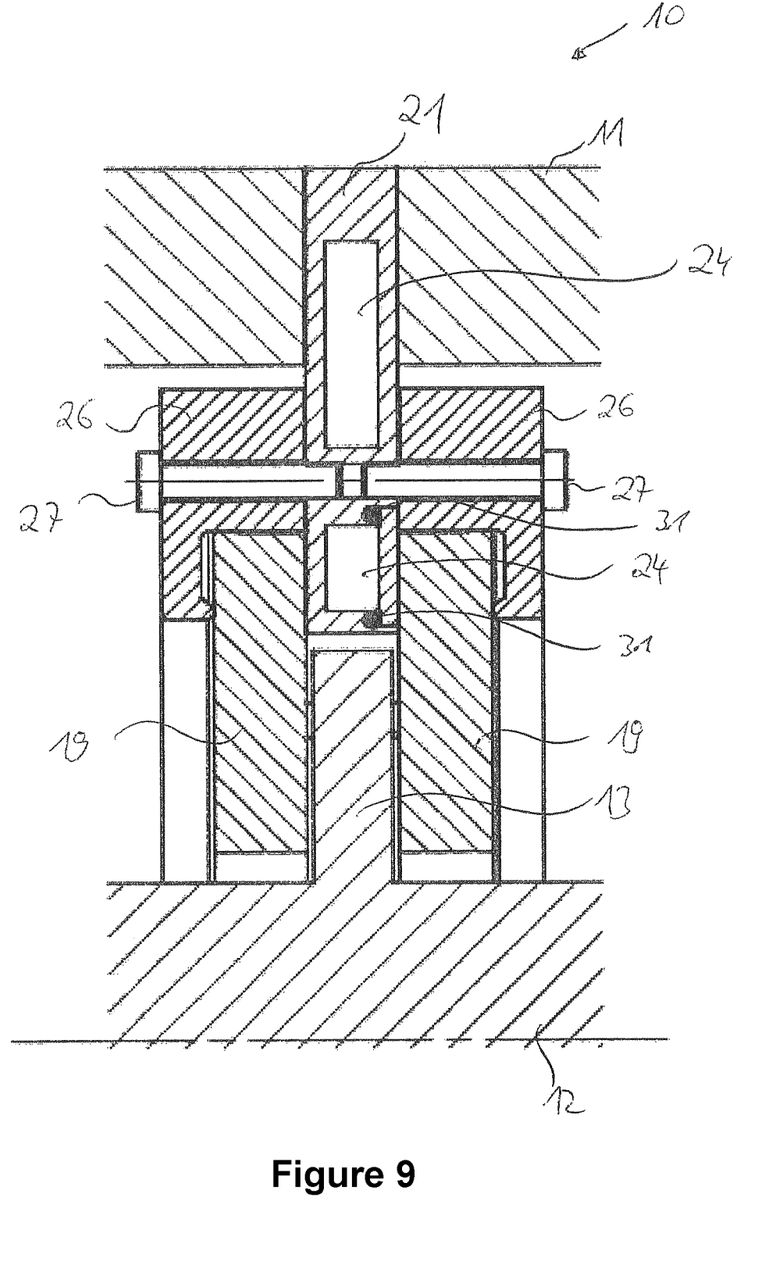
FIG. 9: an eighth rotary system according to the invention with cooling channels in the spacer disc.

FIG. 9 shows that the spacer 21 can also have a cooling channel 24 running, for example, in the circumferential direction—both radially inside and radially outside the clamping screws 27. The cooling channels 24 running radially inside the clamping screws 27 are enclosed by two parts of the spacer 21 which are connected in the axial direction via O-rings 31. The two cooling channels 24 are connected by radial cooling channels which are not visible in the cross-sectional view according to FIG. 9.

Figure 10:
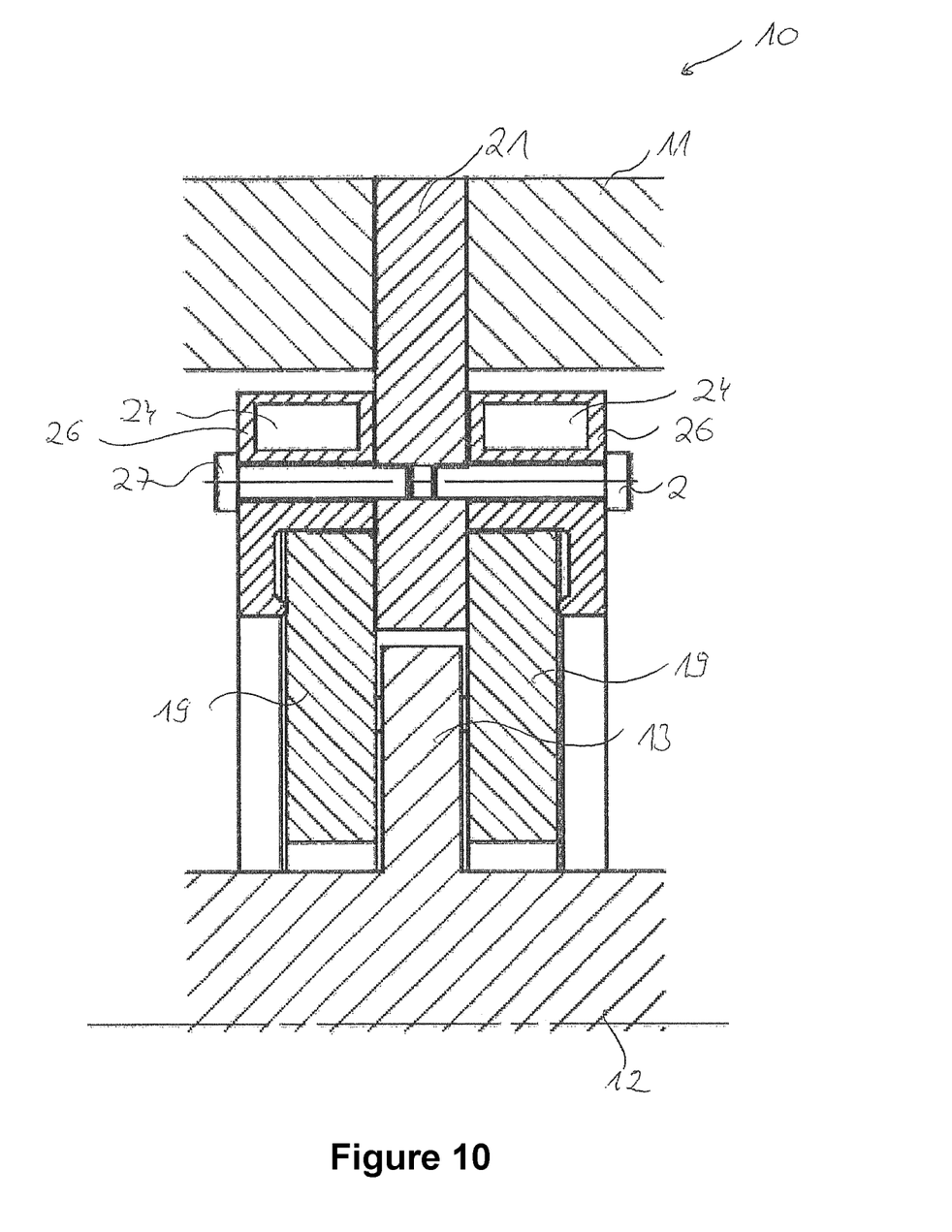
FIG. 10: a ninth rotary system according to the invention with cooling channels in the clamping blocks.

In FIG. 10, the terminal blocks 26 are provided with cooling channels 24 running in the circumferential direction radially outside the clamping screws 27.

Figure 11:
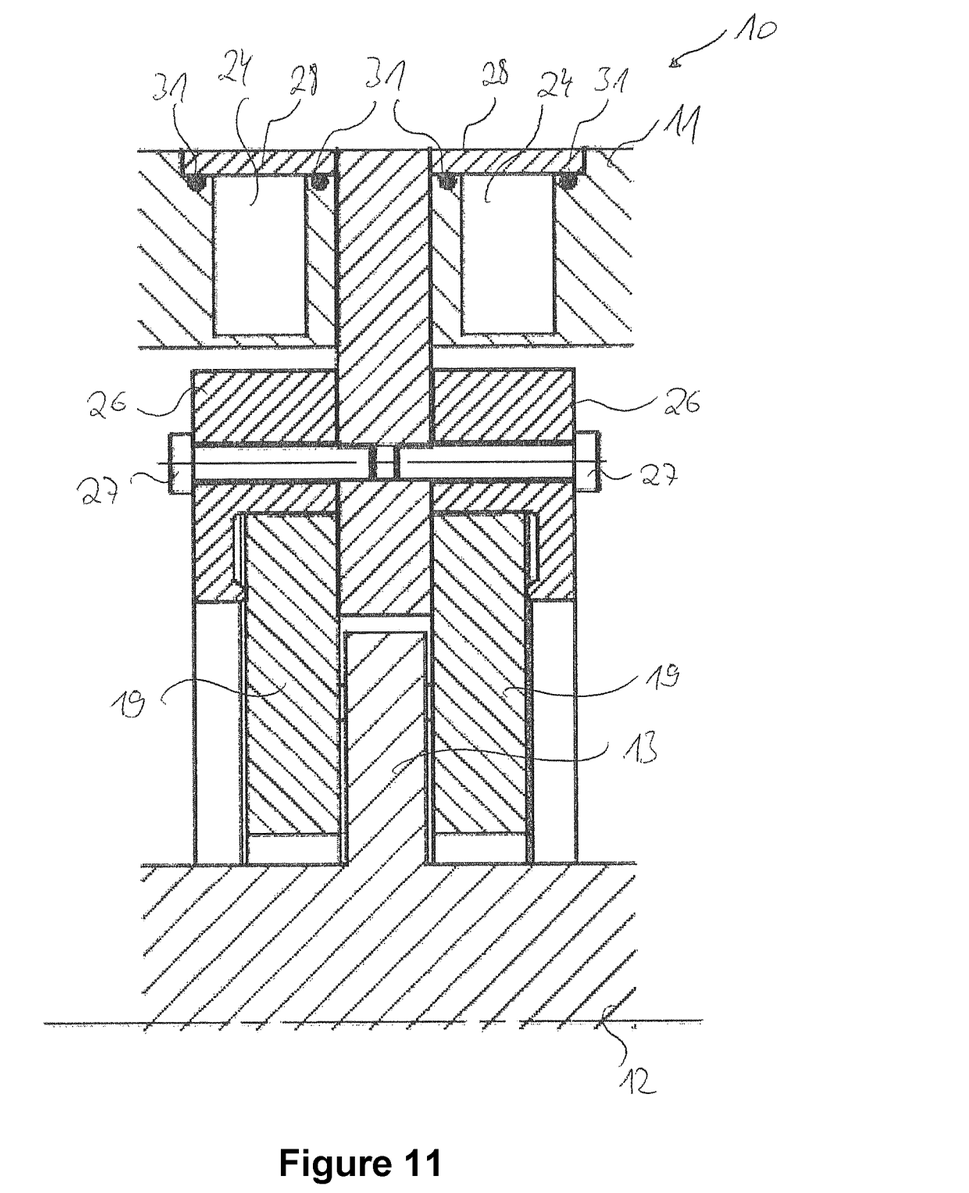
FIG. 11: a tenth rotary system according to the invention with cooling channels in the housing.
Figure 12:
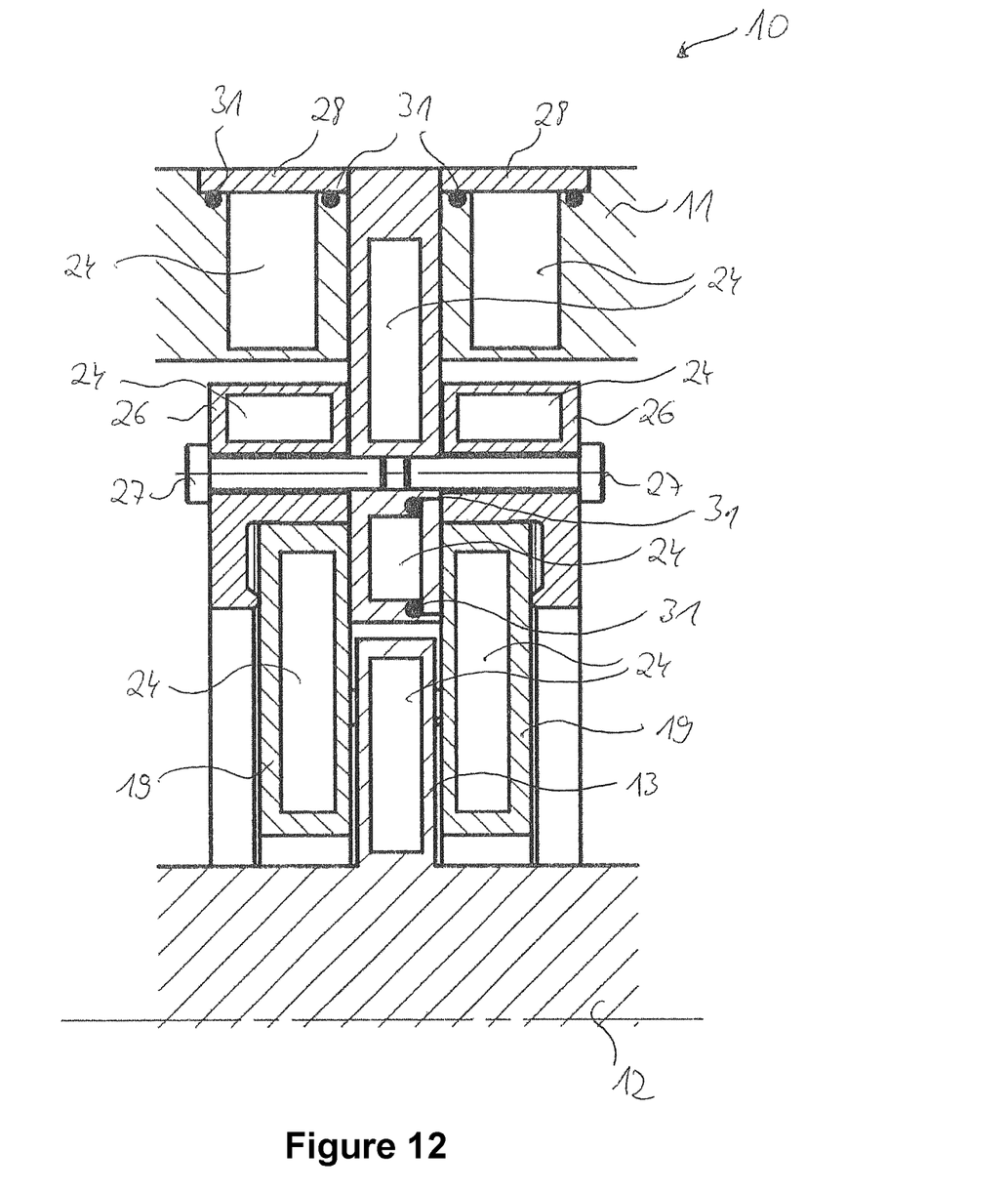
FIG. 12: an eleventh rotary system according to the invention with several cooling channels.

In FIG. 11, it is the housing 11 which is provided with cooling channels 24 running, for example, in the circumferential direction. These cooling channels 24 are arranged in axial direction on both sides of the spacer disk 21 and closed off in radial direction to the outside by covers 28, which are fitted sealingly with O-rings 31. Alternatively, the cooling channels 24 can also be inserted directly into the housing 11 without a cover, for example by laser sintering or laser welding. FIG. 12 shows an embodiment containing all the cooling channels 24 shown in FIGS. 7 to 11 (except for the two cooling channels 29 and 30 shown in FIG. 7).

Figure 13:
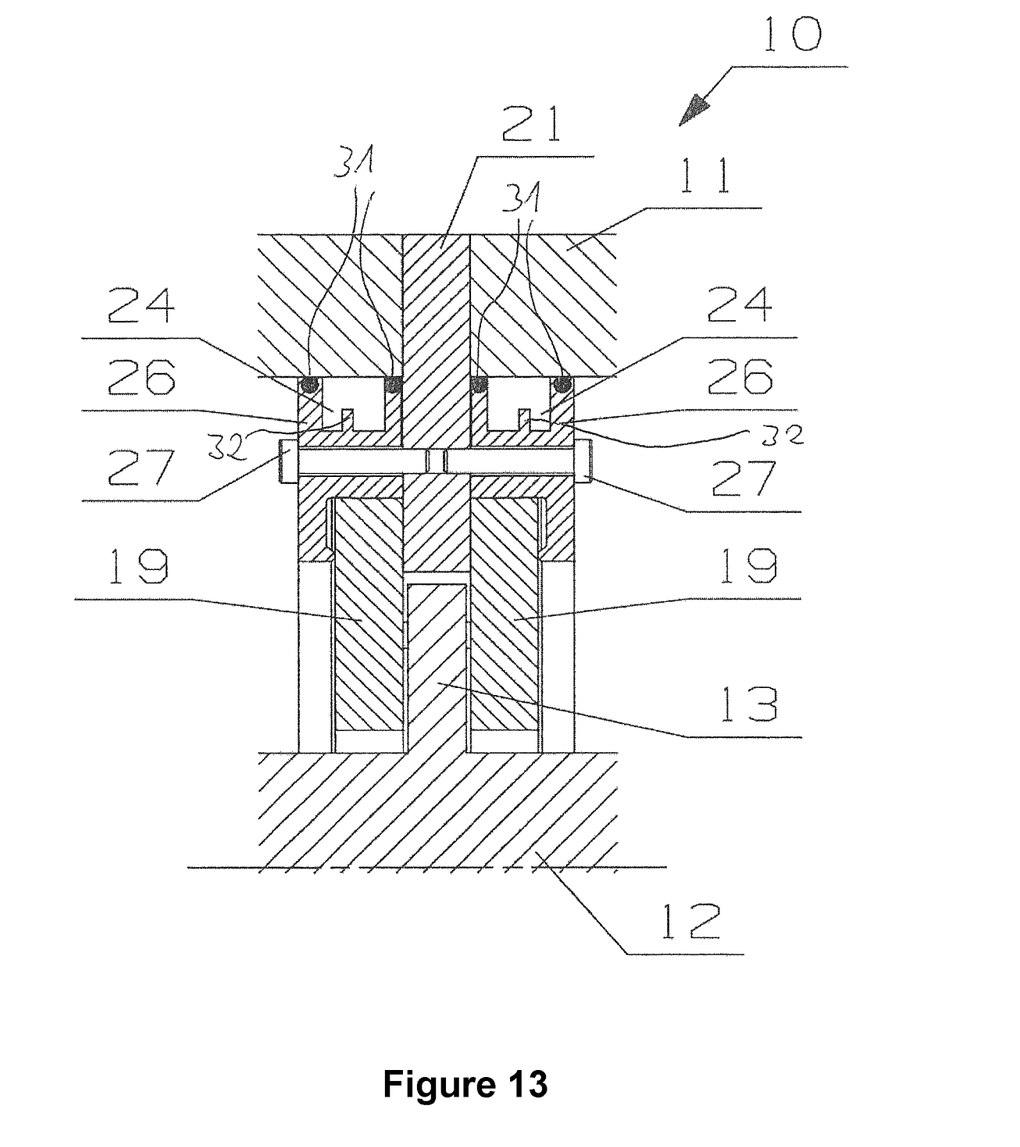
FIG. 13: a twelfth rotary system according to the invention with several cooling channels.

The embodiment shown in FIG. 13 contains 24 cooling channels running in the circumferential direction, which are arranged on both sides of the spacer disk 21 and formed between the terminal blocks 26 and the housing 11. O-rings 31 are provided for elastic sealing between terminal blocks 26 and housing 11.

Circumferential cooling fins 32 are formed on the radial outside of the terminal blocks 26, which extend into the cooling channels 24. The cooling fins 32 increase the surface area in the cooling channels 24 and thus contribute to better heat transfer and better cooling of the axial bearing.

The invention claimed is:

1. A rotary system with at least one axial gas bearing containing:
   a housing,
   a shaft rotatable relative to the housing,
   at least one bearing washer fastened to the shaft, and
   at least one bearing assembly which supports the bearing washer relative to the housing by an axial gas bearing,
   wherein the bearing assembly has, from inside to outside,
     a radially inner region supporting the bearing washer, a radially central region and a radially outer region held by the housing, the radially inner region contains at least one axial bearing element and at least one holding element, and the bearing washer is supported by the axial bearing element and the holding element holds the axial bearing element in the axial direction.

2. The rotary system according to claim 1, wherein the radially central region is more elastic than the radially inner region.

3. The rotary system according to claim 2, wherein the radially central region is more elastic than the radially inner region due to at least one material weakening of the radially central region.

4. The rotary system according to claim 1, wherein the radially central region is more elastic than the radially outer region.

5. The rotary system according to claim 4, wherein the radially central region is more elastic than the radially outer region due to at least one material weakening of the radially central region.

6. The rotary system according to claim 2, wherein the at least one material weakening is formed by a recess formed in the axial direction or by an opening penetrating the bearing assembly.

7. The rotary system according to claim 4, wherein the at least one material weakening is formed by a recess formed in the axial direction or by an opening penetrating the bearing assembly.

8. The rotary system according to claim 1, wherein the holding element holds the axial bearing element by a holding mechanism selected from the group consisting of clamping, screwing, soldering, welding, shrinking, pressing, gluing, crystallization connection, press connection, plastic casting and laser sintering.

9. The rotary system according to claim 8, wherein the at least one axial bearing element contains, or is formed by, two axial bearing washers and the at least one holding element contains, or is formed by, two clamping rings, and the bearing washer is mounted between the axial bearing washers and the clamping rings clamp the axial bearing washers in the axial direction.

10. The rotary system according to claim 1, wherein the radially central region of the bearing assembly is formed by an inner section of a spacer disc to which the radially inner region of the bearing assembly is fastened.

11. The rotary system according to claim 10, wherein the radially outer region of the bearing assembly is formed by an outer section of the spacer disc held on the housing.

12. The rotary system according to claim 10, wherein the inner section of the spacer disc extends between two axial bearing washers of the radially inner region of the bearing assembly between which the bearing washer is supported.

13. The rotary system according to claim 1, wherein the radially central region has a modulus of elasticity in the range from 1,000 MPa to 700000 MPa.

14. The rotary system according to claim 1, wherein the radially inner region has a modulus of elasticity in the range from 1,000 MPa to 700,000 MPa.

15. The rotary system according to claim 1, wherein the radially inner region has a modulus of elasticity in the range from 10,000 MPa to 900,000 MPa.

16. The rotary system according to claim 1, wherein the bearing assembly has at least one cooling channel which extends in the circumferential direction.

17. The rotary system according to claim 1, wherein a circumferentially extending cooling channel is connected to a radial cooling channel in the bearing assembly.

18. The rotary system according to claim 17, wherein the radial cooling channel in the bearing assembly is connected to an axial cooling channel in the housing.

19. The rotary system according to claim 1, wherein the rotary system is selected from the group consisting of turbomachines, engines generators, turbines, coupling systems and flywheels.

* * * * *